July 11, 1933.                H. LAUB                1,918,209

HEATING SYSTEM

Filed Nov. 13, 1931

Inventor:
Hans Laub,
by Charles V. Tullar
His Attorney.

Patented July 11, 1933

1,918,209

UNITED STATES PATENT OFFICE

HANS LAUB, OF WILMERSDORF, GERMANY

HEATING SYSTEM

Application filed November 13, 1931, Serial No. 574,861, and in Germany November 12, 1930.

My invention relates to heating systems and more particularly to induction furnaces of the coreless type and has for its object the provision of a reliable and efficient means for generating high frequency currents for the furnace.

Heretofore the high frequency current necessary for the operation of the induction furnace has been obtained by the use of rotary machines or spark gaps and the like.

In carrying out my invention I incorporate the inductor winding of the furnace directly into the circuits of an inverter without the use of an intermediate transformer. Preferably direct current is supplied to the inverter, the inverter transforming that direct current into alternating current in the inductor winding of the furnace. The metal charge of the furnace serves as a secondary winding as is well understood in the art.

Figure 1:
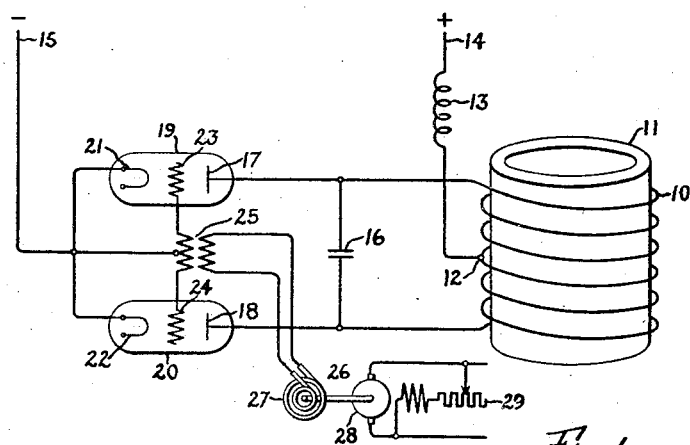
Figure 2:
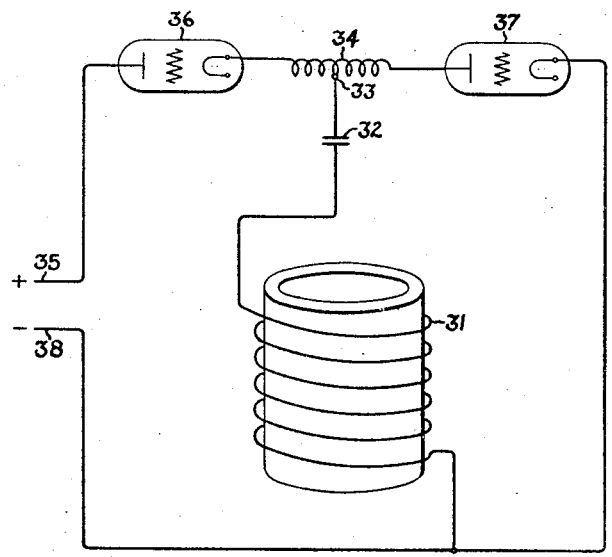

For a more complete understanding of my invention reference should now be had to the drawing in which Fig. 1 diagrammatically shows my invention as applied to an induction furnace and a parallel inverter; Fig. 2 shows my invention as applied to a series inverter used for supplying the high frequency current to an induction furnace.

Referring to the drawing, I have shown my invention in one form as applied to an inductor coil 10 encircling a crucible 11. The inductor coil 10 is provided with a central tap 12 and is connected through a choke coil 13 to the positive pole of a suitable source of direct current supply as is indicated by the supply lines 14 and 15. A capacitor 16 is connected in parallel with the inductor coil 10. The two ends of the inductor coil 10 are respectively connected to the anodes 17 and 18 of the grid controlled arc rectifiers 19 and 20 the cathodes 21 and 22 of the rectifiers are connected to the negative pole 15 of the source of direct current supply. The rectifier grids 23 and 24 are controlled through a transformer 25, the primary of which is connected to a source of supply shown as a motor generator set 26, the generator 27 of which supplies the desired frequency. It is to be understood, however, that the control may be effected by separate or by self excitation.

In the operation of my invention it will be assumed that the arc rectifier 19 is conductive. Current will then flow from supply 14 through a charging circuit including the inductor coil 10, the arc rectifier 19 and to the other supply line 15. Due to the voltage induced across the induction coil 10, the capacitor 16 is charged. As soon as the other rectifier 20 is made conductive, a discharge circuit is completed which circuit includes both rectifiers 19 and 20 and the capacitor 16. The effect of the discharge through this circuit is to render the rectifier 19 non-conductive. Thereafter the capacitor is again charged with opposite polarity and as soon as the rectifier 19 is made conductive the capacitor discharges through the two rectifiers 19 and 20 to render the rectifier 20 non-conductive. It will be understood that this cycle of operation continues as long as may be desired.

Referring now to Fig. 2 I have shown the furnace inductor coil 31 in series with a capacitor 32 connected to the center 33 of a choke coil 34, one end of which leads to the positive pole 35 of a suitable direct current source of supply through a grid controlled rectifier 36. The other end of the choke coil is connected through a second rectifier 37 to the other end of the coil 31 and to the negative pole 38 of the source of supply.

When the rectifier 36 is rendered conductive by positive voltage between its grid and the cathode, current flows from the positive supply line 35 through the arc rectifier 36, the left half of the choke coil 34, the capacitor 32, the furnace coil 31 and to the negative supply line 38. As soon as the capacitor 32 is charged the currents stops its flow. When the arc rectifier 37 is conductive and 36 is non-conductive the capacitor 32 discharges through the right-hand half of the choke coil 34 through the rectifier 37 and the coil 31. The direction of current is therefore reversed relative to the charging current of the capacitor. An alternating field is consequently generated in the coil 31 and its magnetic energy is converted into generated heat in the material which is to be melted and which forms the secondary winding for the inductor coil 31.

The capacitors 16 and 32 are designed so that their charging power substantially compensates for the reactance due to self induction of the furnace coil. Since, however, the inductance of the coil varies as the melting operation progresses, it is advantageous that the capacitors 16 and 32 should be entirely or partially variable. They may then be so adjusted in the course of operation that the inductor coil and the capacitance are always in the proper ratio.

The proper equilibrium between the reactance due to capacity and that due to self induction may also be maintained by varying the control frequency. Accordingly the frequency of the control generator 27 may be controlled by varying the speed of the motor 28. As shown, the motor speed is controlled by means of an adjustable field resistor 29.

While I have shown the particular embodiments of my invention, it will be understood of course that I do not wish to be limited thereto, since many modifications may be made, and I therefore contemplate by the appended claims to cover any such modifications as fall within the true spirit and scope of my invention.

What I claim as new and desire to secure by Letters Patent of the United States is:

1. An electric heating system including an inductor coil, a pair of arc rectifiers inductively coupled together by said inductor coil, means for successively rendering said rectifiers alternately conducting and nonconducting, and a condenser connected between the circuits of said rectifiers for interrupting the current flowing in one rectifier substantially immediately after the other rectifier is made conductive.

2. In an electric induction furnace having an inductor coil the combination of a plurality of grid controlled arc rectifiers, a capacitor, a capacitor charging circuit including one of said rectifiers, a capacitor discharging circuit including another of said rectifiers, and an alternating current circuit including said inductor coil common to said charging and discharging circuits.

3. In an electric induction furnace provided with an inductor coil, the combination of a plurality of arc rectifiers, each provided with a grid for controlling the starting of current between its cathode and anode, a capacitor, capacitor charging and discharging circuits controlled by said rectifiers, means arranged to produce in each of said circuits a countervoltage which is dependent on the current in the other of said circuits, an alternating circuit including said inductor coil common to said charging and discharging circuits.

4. Inductive heating apparatus including the combination of a current conductive means for inducing heating currents, a plurality of electric rectifiers, a capacitor, a capacitor charging circuit including one of said rectifiers, a capacitor discharging circuit including another of said rectifiers, and an alternating current circuit including said current conducting means common to said charging and discharging circuits.

5. Inductive heating apparatus including the combination of an inductor coil for inducing heating currents, a plurality of electric rectifiers, a capacitor, a capacitor charging circuit including one of said rectifiers, a capacitor discharging circuit including another of said rectifiers, and an alternating current circuit including said inductor coil common to said charging and discharging circuits, the said inductor coil inductively coupling together said charging and discharging circuits.

6. In an induction furnace having a charge containing crucible and an inductor coil, the combination of a plurality of grid controlled arc rectifiers inductively coupled together by said coil, a capacitor, connections for connecting said capacitor with said coil to produce a substantially resonant circuit, a variable frequency source of supply for said grids, and means for varying said frequency so as to maintain said circuit substantially resonant.

7. In an induction furnace provided with an inductor coil, the combination of a plurality of arc rectifiers, each provided with a grid for controlling the starting of current between its cathode and anode, means for generating a control voltage for said grids, means for varying the frequency of said control voltage, a capacitor, capacitor charging and discharging circuits controlled by said rectifiers, means arranged to produce in each of said circuits a countervoltage which is dependent on the current in the other of said circuits, an alternating circuit including said inductor coil common to said charging and discharging circuits.

In witness whereof, I have hereunto set my hand.

HANS LAUB.